United States Patent [19]

Yoshimura et al.

[11] Patent Number: 5,578,395
[45] Date of Patent: Nov. 26, 1996

[54] LITHIUM SECONDARY BATTERY

[75] Inventors: Seiji Yoshimura, Hirakata; Yuji Yamamoto, Hyogo; Yoshihiro Shoji; Koji Nishio, both of Hirakata; Toshihiko Saito, Tsuzuki-gun; Nobuhiro Nishiguchi; Keiichi Tsujioku, both of Hyogo; Minoru Fujimoto, Mihara-gun, all of Japan

[73] Assignee: Sanyo Electric Co., Ltd., Osaka, Japan

[21] Appl. No.: 399,622

[22] Filed: Mar. 7, 1995

[30] Foreign Application Priority Data

Mar. 8, 1994 [JP] Japan ................... 6-037020

[51] Int. Cl.$^6$ ..................... H01M 4/36; H01M 4/50; H01M 10/40
[52] U.S. Cl. .................... 429/197; 429/194; 429/218; 429/224
[58] Field of Search ................ 429/194, 197, 429/224, 218

[56] References Cited

U.S. PATENT DOCUMENTS 4,465,747  8/1984  Evans ................. 429/194

FOREIGN PATENT DOCUMENTS 63-114064  5/1988  Japan .
1235158    9/1989  Japan .
2253560   10/1990  Japan .
3297058   12/1991  Japan .
4237970    8/1992  Japan .
  53114    1/1993  Japan .
5283077   10/1993  Japan .
5290846   11/1993  Japan .

Primary Examiner—Stephen Kalafut
Assistant Examiner—Richard H. Lilley, Jr.
Attorney, Agent, or Firm—Birch, Stewart, Kolasch & Birch, LLP

[57] ABSTRACT

A lithium secondary battery comprises a negative electrode having lithium as an active material, a positive electrode comprising a boron-containing lithium-manganese composite oxide as an active material and a nonaqueous electrolyte comprising a solute and a solvent, the boron-containing lithium-manganese composite oxide having an atomic ratio between B and Mn (B/Mn) of 0.01 to 0.20 and an average valence of manganese before charge-discharge of at least 3.80, and the solvent being a mixed solvent containing 5 to 50% by volume of a butylene carbonate. This battery is highly reliable, since the positive electrode active material minimally decomposes and hence the internal resistance minimally increases, even when the battery is continuously charged at a high voltage by mistake.

7 Claims, 2 Drawing Sheets

A1

LITHIUM SECONDARY BATTERY

BACKGROUND OF THE INVENTION

This application claims the priority of Japanese Patent Application No. 6-37020 filed on Mar. 8, 1994 and Japanese Patent Application Reference No. NA 95-1027 filed on Feb. 10, 1995, which are incorporated herein by reference.

1. Field of the Invention

The present invention relates to a lithium secondary battery comprising a negative electrode having lithium as an active material, a positive electrode comprising a boron-containing lithium-manganese composite oxide as an active material and a nonaqueous electrolyte comprising a solute and a solvent. More specifically, the present invention relates to an improved positive electrode active material and an improved nonaqueous electrolyte, for the purpose of providing a highly reliable lithium secondary battery with which the internal resistance minimally increases even when, due to an unpredictable accident or the like causes, it has been continuously charged at a high charge voltage for a long period of time.

2. Description of the Prior Art

Manganese dioxide, which can electrochemically absorb and discharge lithium and produce a high discharge voltage (vs. $Li/Li^+$) has been studied as a positive electrode active material of lithium secondary batteries.

However, to make manganese dioxide usable in practice as a positive electrode active material, it is necessary to improve the stability of its crystal structure (charge-discharge cycle characteristic) during charge-discharge cycles. This is because the crystal structure of manganese dioxide, when subjected to repeated swelling and shrinkage during charge-discharge cycles, readily breaks in a short period of the cycles. To improve the poor stability of crystal structure of manganese dioxide during charge-discharge cycles, for example Japanese Patent Application Laid-open No. 114064/1988 discloses a lithium-manganese composite oxide comprising manganese dioxide and $Li_2MnO_3$. Also, Japanese Patent Application Laid-open No. 235158/1989 discloses a lithium-containing manganese dioxide composite oxide comprising manganese dioxide containing lithium in the crystal lattice (this composite oxide is one of lithium-manganese composite oxides, too).

These lithium-manganese composite oxides, having an excellent charge-discharge characteristic, are sufficiently usable as positive electrode active materials of secondary batteries.

However, lithium secondary batteries with this type of lithium-manganese composite oxide have the following problem. That is, when they are, by mistake, subjected to a continuing application of a high voltage (at least 4 V) exceeding the usual charge voltage (about 3.5 V) for a long time, the lithium-manganese composite oxide decomposes and the decomposition products dissolve out into the nonaqueous electrolyte used, thereby markedly increasing the internal resistance of the batteries.

SUMMARY OF THE INVENTION

Accordingly, an object of the present invention is to solve the above problem and provide a lithium secondary battery with the internal resistance minimally increasing upon high-voltage continuous charge, by improving the positive electrode active material and the solvent for the nonaqueous electrolyte used.

The present invention provides a lithium secondary battery comprising a negative electrode having lithium as an active material, a positive electrode comprising a boron-containing lithium-manganese composite oxide and a nonaqueous electrolyte comprising a solute and a solvent, said boron-containing lithium-manganese composite oxide having an atomic ratio between B and Mn (B/Mn) of 0.01 to 0.20 and an average valence of manganese before charge-discharge of at least 3.80, and said solvent being a mixed solvent containing 5 to 50% by volume of a butylene carbonate.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
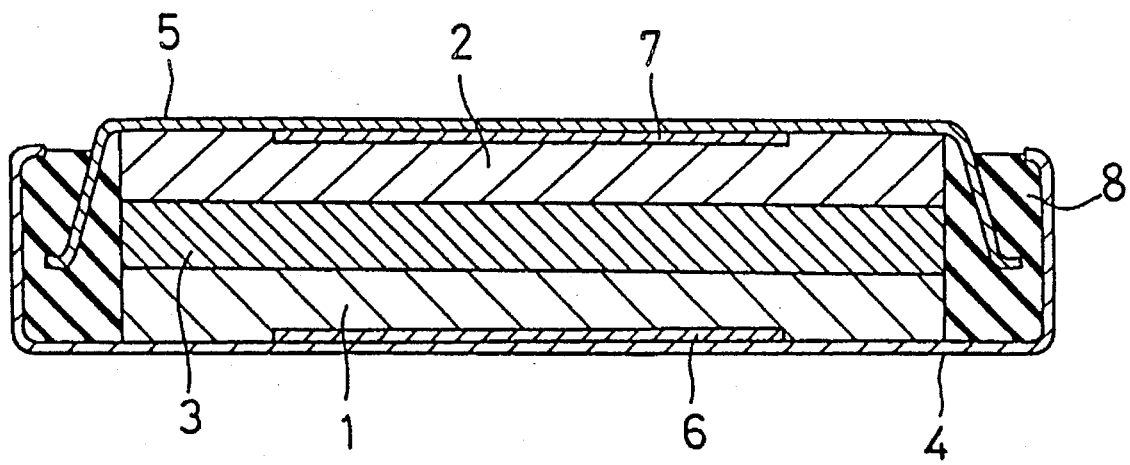
FIG. 1 is a cross-sectional view of the lithium secondary battery according to the present invention assembled in Example 1-1.

The boron-containing lithium-manganese composite oxide used in the present invention should have an atomic ratio between B and Mn (B/Mn) of 0.01 to 0.20 and an average valence of manganese before charge-discharge of at least 3.80. This is because: if a boron-containing lithium-manganese composite oxide with the atomic ratio (B/Mn) or the average valence of manganese deviating from the above range is used as the positive electrode material of a secondary battery, the positive electrode active material will decompose on high-voltage continuous charge and the resulting decomposition products will dissolve out into the nonaqueous electrolyte used, thereby markedly increasing the internal resistance of the battery.

The fact that an atomic ratio (B/Mn) deviating from the above range makes the positive electrode active material decompose upon high-voltage continuous charge is considered to be due to the following. When the atomic ratio is less than 0.01, i.e. the boron content is too small, the crystal structure of the boron-containing lithium-manganese composite oxide does not stabilize sufficiently; while when the ratio exceeds 0.20, boron or its compounds does not dissolve in the lithium-manganese composite oxide to form a solid solution, thereby instabilizing the crystal structure.

The fact that an average valence of manganese deviating from the above range makes the positive electrode active material decompose upon high-voltage continuous charge is considered to be due to the following. With the average valence before charge-discharge of the manganese being less than 3.80, the average valence increases on charge from a low value (less than 3.80) to about 4, thus changing to a large extent, which destroys the electronic state of the boron-containing lithium-manganese composite oxide, thereby instabilizing the crystal structure.

Examples of the boron-containing lithium-manganese composite oxide are those having a structure comprising lithium-containing manganese dioxide composite oxide having boron or a boron compound dissolved therein.

The lithium-containing manganese composite oxide comprising a lithium-containing manganese dioxide composite oxide having boron or a boron compound dissolved therein and having an atomic ratio (B/Mn) of 0.01 to 0.20 and an average valence of manganese of at least 3.80 can be obtained by, for example, heat treating a mixture of a boron compound, a lithium compound and a manganese compound in an atomic ratio of B:Li:Mn of 0.01–0.20:0.1–2.0:1 at a temperature of 150° to 430° C., preferably 250° to 430° C. and most preferably 300° to 430° C. If the heat treating temperature is lower than 150° C., the reaction will not proceed sufficiently or the moisture contained in $MnO_2$ will not be removed sufficiently. On the other hand, if the heat treating temperature exceeds 430° C., the manganese dioxide will decompose and the resulting manganese will have an average valence of less than 3.80. As a result, the electronic balance of the lithium-boron-containing manganese oxide tends, on charge and discharge, to decompose and dissolve out into the nonaqueous electrolyte used. The heat treatment is carried out in air.

In particular, heat treating a mixture of a boron compound, lithium compound and manganese compound in an atomic ratio of B:Li:Mn of 0.01–0.20:0.1–2.0:1 at a temperature of 300° to 430° C. yields a boron-containing lithium-manganese composite oxide comprising a composite oxide of $Li_2MnO_3$ and $MnO_2$ having dissolved therein boron or a boron compound and having an atomic ratio (S/Mn) of 0.01 to 0.20 and an average valence of manganese of at least 3.80. The heat treatment here is also carried out in air. This composite oxide comprising $Li_2MnO_3$ and $MnO_2$ has an excellent charge-discharge cycle characteristic and, when further permitted to have boron or a boron compound dissolved therein, gives ones being considerably excellent in both charge-discharge characteristic and stability on high-voltage continuous charge (high-voltage continuous charge characteristic). However, to obtain one having still better high-voltage characteristic, it is necessary that, as described later in Examples, the solvent for nonaqueous electrolyte is a specific one having a designated amount of a butylene carbonate as specified in the present invention.

Examples of the boron compound used in the invention are boron oxide ($B_2O_3$) and boric acid, those of the lithium compound are lithium hydroxide (LiOH), lithium carbonate ($Li_2CO_3$), lithium oxide ($Li_2O$) and lithium nitrate ($LiNO_3$) and those of the manganese compound are manganese dioxide and manganese oxyhydroxide (MnOOH).

The solvent for a nonaqueous electrolyte used in the invention is a mixed solvent containing 5 to 50% by volume of a butylene carbonate (BC). The butylene carbonate may be any one of 1,2-butylene carbonate, 2,3-butylene carbonate and isobutylene carbonate. With a butylene carbonate content of only less than 5% by volume, the internal pressure of the resulting battery markedly increases after high-voltage continuous charge. On the other hand, a butylene carbonate content exceeding 50% by volume decreases the discharge capacity.

Examples of the counterpart solvent to be mixed with a butylene carbonate are ethylene carbonate (EC), 1,2-dimethoxyethane (DME), propylene carbonate (PC), vinylene carbonate (VC), γ-butyrolactone (γ-BL), dimethyl carbonate (DMC), diethyl carbonate (DEC), methylethyl carbonate (MEC), tetrahydrofuran (THF), dioxolane (DOXL), 1,2-ethoxymethoxyethane (EME), sulfolane (SL) and 1,2-diethoxyethane (DEE). In particular, use of a mixed solvent comprising 5–50% by volume of a butylene carbonate and 95–50% by volume of ethylene carbonate (EC) alone or a mixture of ethylene carbonate and any one of the above exemplified solvents increases the storage characteristic to a large extent. The amount of the butylene carbonate contained in the mixed solvent should be 5–50% by volume. If the ratio is less than 5% by volume, use of the above specific boron-containing lithium-manganese composite oxide as a positive electrode active material will not effectively suppress the increase of the internal resistance of the resulting secondary battery. On the other hand, with the ratio exceeding 50% by volume, the discharge capacity decreases.

Examples of usable solutes for the electrolyte in the invention are $LiCF_3SO_3$, $LiPF_6$, $LiBF_4$, $LiAsF_6$ and $LiClO_4$.

The negative electrode used in the invention may be made of any material that can electrochemically absorb and discharge lithium, or be lithium metal. Examples of materials that can electrochemically absorb and discharge lithium are lithium alloys (lithium-aluminum, lithium-lead, lithium-tin and like alloys) and carbon materials such as graphite and coke.

With the battery of the present invention, comprising a positive electrode of a lithium-manganese composite oxide having a specific boron content and a specific average valence of manganese and a solvent for the nonaqueous electrolyte used of a mixed solvent containing a specific amount of a butylene carbonate, the positive electrode material minimally decomposes and hence the internal resistance minimally increases, even upon high-voltage continuous charge. In order to suppress the increase of the internal resistance of the battery effectively, it is necessary to use both of the positive electrode material and the solvent for nonaqueous electrolyte specified in the present invention. Specifying as in the present invention either the positive electrode material or the solvent alone cannot effectively suppress the increase of the internal resistance of the battery after high-voltage continuous charge.

Other features of the invention will become more apparent in the course of the following descriptions of exemplary embodiments which are given for illustration of the invention and are not intended to be limiting thereof.

EXAMPLES

Example 1-1

(Preparation of positive electrode)

There were mixed lithium hydroxide (LiOH), boron oxide ($B_2O_3$) and manganese dioxide ($MnO_2$) in an atomic ratio of Li:B:Mn of 0.53:0.06:1.00. The mixture was heat treated (burned) in air at a temperature of 375° C. for 20 hours and then pulverized, to give a boron-containing lithium-manganese composite oxide as a positive electrode active material. Upon X-ray diffractometry on this boron-containing lithium-manganese composite oxide, there were observed in the obtained X-ray diffraction pattern nothing but a peak of $Li_2MnO_3$ and a peak of $MnO_2$ that shifted to a rather low-angle side from the inherent peak position. The boron-containing lithium-manganese composite oxide was tested for the average valence of the manganese, which was found to be 3.80.

The average valence of manganese in the boron-containing lithium-manganese composite oxide was determined as follows. The sample was dissolved in hydrochloride, to give a sample solution. An aqueous ferrous ammonium sulfate solution was added to the sample solution and the excess ferrous ammonium sulfate was titrated with an aqueous potassium permanganate solution, to obtain the effective oxygen content (oxidizing power of manganese) of the solution by chemical titration. Separately, the manganese content in the above solution was determined by atomic absorption analysis. The average valence of manganese was calculated from the effective oxygen content and manganese content thus obtained.

The fact that the average valence of manganese is smaller than 4, which is calculated by the composition formula, is considered to be due to that some amount of lithium has dissolved into $MnO_2$ to form a solid solution. The shift of the $MnO_2$ peak in the X-ray diffraction pattern to the low angle side is also attributable to the same reason.

A positive electrode material was obtained by mixing the boron-containing lithium-manganese composite oxide obtained above, carbon black (powder) as a conductive agent and fluororesin (powder) as a binder in a ratio by weight of 85:10:5. The positive electrode material was molded into discs, which were then each dried in vacuum at 250° C. for 2 hours to give a positive electrode.
(Preparation of negative electrode)

A lithium-aluminum alloy prepared electrochemically was punched into discs, each of which gave a negative electrode.
(Preparation of nonaqueous electrolyte)

A solute of lithium trifluoromethanesulfonate ($LiCF_3SO_3$) was dissolved in a concentration of 1 mole/l in a mixed solvent of 1,2-butylene carbonate (BC), ethylene carbonate (EC) and 1,2-dimethoxyethane (DME) in a ratio by volume of 25:25:50, to obtain a nonaqueous electrolyte.
(Assembling of battery)

A flat-type battery A1 (lithium secondary battery; size: outer diameter 24 mm, thickness 3 mm) according to the present invention was prepared from the above positive and negative electrodes and nonaqueous electrolyte. A separator of a polypropylene microporous film was used, which was impregnated with the nonaqueous electrolyte.

FIG. 1 is a schematic cross-sectional view of the battery A1 according to the present invention thus assembled. In the FIGURE, the battery A1 according to the present invention comprises a positive electrode 1, a negative electrode 2, a separator 3 separating the two electrodes 1 and 2 from each other, a positive electrode can 4, a negative electrode can 5, a positive electrode collector [stainless steel plate (SUS316)] 6, a negative electrode collector [stainless steel plate (SUS304)] 7 and a polypropylene insulating packing 8.

The positive electrode 1 and the negative electrode 2 are, while facing each other via the separator 3 impregnated with the nonaqueous electrolyte, housed in a battery case formed by the positive and negative electrode cans 4 and 5. The positive electrode 1 is connected to the positive electrode can 4 via the positive electrode collector 6 and the negative electrode 2 to the negative electrode can 5 via the negative electrode collector 7, so that the chemical energy generated in the battery can be taken out as electric energy from the terminals of the positive and negative electrode cans 4 and 5.

The internal resistance of the battery before charge and discharge was measured, to be 10Ω (in all of the following Examples and Comparative Examples, the internal resistances of the batteries assembled were all 10Ω.

Example 1-2

Example 1-1 was repeated except that a mixed solvent of 1,2-butylene carbonate (BC), ethylene carbonate (EC) and 1,2-dimethoxyethane (DME) in a ratio by volume of 5:45:50 was used for the nonaqueous electrolyte, to prepare a battery A2 according to the present invention.

Example 1-3

Example 1-1 was repeated except that a mixed solvent of 1,2-butylene carbonate (BC), ethylene carbonate (EC) and 1,2-dimethoxyethane (DME) in a ratio by volume of 10:40:50 was used for the nonaqueous electrolyte, to prepare a battery A3 according to the present invention.

Example 1-4

Example 1-1 was repeated except that a mixed solvent of 1,2-butylene carbonate (BC), ethylene carbonate (EC) and 1,2-dimethoxyethane (DME) in a ratio by volume of 40:10:50 was used for the nonaqueous electrolyte, to prepare a battery A4 according to the present invention.

Example 1-5

Example 1-1 was repeated except that a mixed solvent of 1,2-butylene carbonate (BC) and 1,2-dimethoxyethane (DME) in a ratio by volume of 50:50 was used for the nonaqueous electrolyte, to prepare a battery A5 according to the present invention.

Comparative Example 1-1

Example 1-1 was repeated except that a mixed solvent of ethylene carbonate (EC) and 1,2-dimethoxyethane (DME) in a ratio by volume of 50:50 was used for the nonaqueous electrolyte, to prepare a comparison battery X.
(High-voltage continuous charge test)

The batteries A1 through A5 according to the present invention and the comparison battery X were continuously charged at a constant voltage of 4.0 V for 20 weeks and then measured for the internal resistance. The results are given in Table 1.

TABLE 1

|  | Mixing ratio of $LiOH$, $B_2O_3$ and $MnO_2$ (atomic ratio of Li:B:Mn) | Heat treating temp. (°C.) | Heat treating atmosphere | Crystal struture of composite oxide | Valence of Mn | Mixing ratio of solvent; BC: EC:DME (by volume) | Internal resistance (Ω) of battery after charge for 20 weeks |
| --- | --- | --- | --- | --- | --- | --- | --- |
| Comparison battery X | 0.53:0.06:1.00 | 375 | in air | $Li_2MnO_3 + MnO_2$ | 3.80 | 0:50:50 | 22 |
| Battery A2 of the invention | 0.53:0.06:1.00 | 375 | in air | $Li_2MnO_3 + MnO_2$ | 3.80 | 5:45:50 | 16 |
| Battery A3 of the invention | 0.53:0.06:1.00 | 375 | in air | $Li_2MnO_3 + MnO_2$ | 3.80 | 10:40:50 | 12 |
| Battery A1 | 0.53:0.06:1.00 | 375 | in air | $Li_2MnO_3 + MnO_2$ | 3.80 | 25:25:50 | 10 |

TABLE 1-continued

| | Mixing ratio of LiOH, $B_2O_3$ and $MnO_2$ (atomic ratio of Li:B:Mn) | Heat treating temp. (°C.) | Heat treating atmosphere | Crystal struture of composite oxide | Valence of Mn | Mixing ratio of solvent; BC: EC:DME (by volume) | Internal resistance (Ω) of battery after charge for 20 weeks |
|---|---|---|---|---|---|---|---|
| of the invention Battery A4 of the invention | 0.53:0.06:1.00 | 375 | in air | $Li_2MnO_3$ + $MnO_2$ | 3.80 | 40:10:50 | 10 |
| Battery A5 of the invention | 0.53:0.06:1.00 | 375 | in air | $Li_2MnO_3$ + $MnO_2$ | 3.80 | 50:0:50 | 10 |

Table 1 shows that: while with the comparison battery X using a mixed solvent containing no butylene carbonate, the internal resistance after continuous charge increased to 22Ω, i.e. more than twice the initial value; the battery A2 according to the present invention using a mixed solvent containing 5% by volume of a butylene carbonate suppressed the increase of its internal resistance after continuous charge. This effect of suppressing the increase of internal resistance became more marked in proportion to the content of a butylene carbonate. Although the effect of suppressing the internal resistance after continuous charge does not decrease even when the butylene carbonate content somewhat exceeds 50% by volume, the then discharge capacity does decrease. It is therefore necessary, in view of good balance between the battery characteristics, to restrict the content within the range of 5 to 50% by volume.

Example 2-1

Example 1-1 was repeated except that a positive electrode active material of a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.505:0.01:1.00 and then heat treating the mixture in air at a temperature of 375° C. for 20 hours was used, to assemble a battery B1 according to the present invention.

Example 2-2

Example 1-1 was repeated except that a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.51:0.02:1.00 and then heat treating the mixture in air at a temperature of 375° C. for 20 hours was used, to assemble a battery B2 according to the present invention.

Example 2-3

The battery A1 according to the present invention prepared in Example 1-1 was, as a battery B3 according to the present invention, again subjected to the high-voltage continuous charge test here.

Example 2-4

Example 1-1 was repeated except that a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.55:0.10:1.00 and then heat treating the mixture in air at a temperature of 375° C. for 20 hours was used, to assemble a battery B4 according to the present invention.

Example 2-5

Example 1-1 was repeated except that a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.60:0.20:1.00 and then heat treating the mixture in air at a temperature of 375° C. for 20 hours was used, to assemble a battery B5 according to the present invention.

Comparative Example 2

Example 1-1 was repeated except that a lithium-manganese composite oxide containing no boron and obtained by mixing lithium hydroxide (LiOH) and manganese dioxide ($MnO_2$) in an atomic ratio of Li:Mn of 0.50:1.00 and then heat treating the mixture in air at a temperature of 375° C. for 20 hours was used, to assemble a comparison battery Y.
(High-voltage continuous charge test)

The batteries B1 through B5 according to the present invention and the comparison battery Y were continuously charged under the same conditions as above and then measured for the internal resistance. The results are given in Table 2.

TABLE 2

| | Mixing ratio of LiOH, $B_2O_3$ and $MnO_2$ (atomic ratio of Li:B:Mn) | Heat treating temp. (°C.) | Heat treating atmosphere | Crystal struture of composite oxide | Valence of Mn | Mixing ratio of solvent; BC: EC:DME (by volume) | Internal resistance (Ω) of battery after charge for 20 weeks |
|---|---|---|---|---|---|---|---|
| Comparison battery Y | 0.50:0:1.00 | 375 | in air | $Li_2MnO_3$ + $MnO_2$ | 3.80 | 25:25:50 | 60 |
| Battery B1 of the | 0.505:0.01:1.00 | 375 | in air | $Li_2MnO_3$ + $MnO_2$ | 3.80 | 25:25:50 | 13 |

TABLE 2-continued

|  | Mixing ratio of LiOH, $B_2O_3$ and $MnO_2$ (atomic ratio of Li:B:Mn) | Heat treating temp. (°C.) | Heat treating atmosphere | Crystal struture of composite oxide | Valence of Mn | Mixing ratio of solvent; BC: EC:DME (by volume) | Internal resistance ($\Omega$) of battery after charge for 20 weeks |
|---|---|---|---|---|---|---|---|
| Battery B2 of the invention | 0.51:0.02:1.00 | 375 | in air | $Li_2MnO_3 + MnO_2$ | 3.80 | 25:25:50 | 11 |
| Battery B3 of the invention | 0.53:0.06:1.00 | 375 | in air | $Li_2MnO_3 + MnO_2$ | 3.80 | 25:25:50 | 10 |
| Battery B4 of the invention | 0.55:0.10:1.00 | 375 | in air | $Li_2MnO_3 + MnO_2$ | 3.80 | 25:25:50 | 10 |
| Battery B5 of the invention | 0.60:0.20:1.00 | 375 | in air | $Li_2MnO_3 + MnO_2$ | 3.80 | 25:25:50 | 10 |

Table 2 shows that: while with the comparison battery Y using a positive electrode active material of a lithium-manganese composite oxide containing no boron or boron compound, the internal resistance after continuous charge increased to 60Ω, i.e. more than three times the initial value; the battery B1 according to the present invention using a positive electrode active material of a boron-containing lithium-manganese composite oxide having an atomic ratio between boron and manganese (B/Mn) of 0.01 suppressed the increase of its internal resistance. This effect of suppressing the increase of internal resistance became more marked in proportion to the content of boron or boron compound. However, too large a content of boron or boron compound in the boron-containing lithium manganese composite oxide used, which decreases the manganese content to a very low level, decreases the battery capacity. It is therefore necessary to maintain the atomic ratio of boron or boron compound (B/Mn) at not more than 0.20. With the atomic ratio (B/Mn) being kept at not more than 0.20, the boron or boron compound dissolves in the mother crystal to form a solid solution, so that the crystal structure does not change during heat treatment and is maintained to be one in which $Li_2MnO_3$ and $MnO_2$ are combined.

Example 3-1

Example 1-1 was repeated except that a positive electrode active material of a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.53:0.06:1.00 and then heat treating the mixture in air at a temperature of 250° C. for 20 hours was used, to assemble a battery C1 according to the present invention.

Example 3-2

The battery A1 according to the present invention prepared in Example 1-1 was, as a battery C2 according to the present invention, again subjected to the high-voltage continuous charge test here.

Example 3-3

Example 1-1 was repeated except that a positive electrode active material of a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.53:0.06:1.00 and then heat treating the mixture in air at a temperature of 250° C. for 20 hours was used and that a mixed solvent of 1,2-butylene carbonate (BC) and 1,2-dimethoxyethane (DME) in a ratio by volume of 50:50 was used for the nonaqueous electrolyte, to assemble a battery C3 according to the present invention.

Example 3-4

The battery A5 according to the present invention prepared in Example 1-5 was, as a battery C4 according to the present invention, again subjected to the high-voltage continuous charge test here.

Comparative Example 3-1

Example 1-1 was repeated except that a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.53:0.06:1.00 and then heat treating the mixture in air at a temperature of 500° C. for 20 hours, to assemble a comparison battery Z1. The boron-containing lithium-manganese composite oxide used here was similar to that disclosed in Japanese Patent Application Laid-open 237970/1992.

Comparative Example 3-2

Example 1-1 was repeated except that a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.53:0.06:1.00 and then heat treating the mixture in air at a temperature of 850° C. for 20 hours, to assemble a comparison battery Z2. The boron-containing lithium-manganese composite oxide used here was similar to that disclosed in Japanese Patent Application Laid-open 237970/1992.

Comparative Example 3-3

Example 1-1 was repeated except that a positive electrode active material of a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.53:0.06:1.00 and then heat treating the mixture in air at a temperature of 500° C. for 20 hours was used and that a mixed solvent of 1,2-butylene carbonate (BC) and 1,2-dimethoxyethane (DME) in a ratio by volume of 50:50 was used for the nonaqueous electrolyte, to assemble a comparison battery Z3.

Comparative Example 3-4

Example 1-1 was repeated except that a positive electrode active material of a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.53:0.06:1.00 and then heat treating the mixture in air at a temperature of 850° C. for 20 hours was used and that a mixed solvent of 1,2-butylene carbonate (BC) and 1,2-dimethoxyethane (DME) in a ratio by volume of 50:50 was used for the nonaqueous electrolyte, to assemble a comparison battery Z4.

Comparative Example 3-5

Example 1-1 was repeated except that a positive electrode active material of a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.53:0.06:1.00 and then heat treating the mixture in air at a temperature of 250° C. for 20 hours was used and that a mixed solvent of ethylene carbonate (EC) and 1,2-dimethoxyethane (DME) in a ratio by volume of 50:50 was used for the nonaqueous electrolyte, to assemble a comparison battery Z5.

Comparative Example 3-6

Example 1-1 was repeated except that a mixed solvent of ethylene carbonate (EC) and 1,2-dimethoxyethane (DME) in a ratio by volume of 50:50 was used for the nonaqueous electrolyte, to assemble a comparison battery Z5.

Comparative Example 3-7

Example 1-1 was repeated except that a positive electrode active material of a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.53:0.06:1.00 and then heat treating the mixture in air at a temperature of 500° C. for 20 hours was used and that a mixed solvent of ethylene carbonate (EC) and 1,2-dimethoxyethane (DME) in a ratio by volume of 50:50 was used for the nonaqueous electrolyte, to assemble a comparison battery Z7.

Comparative Example 3-8

Example 1-1 was repeated except that a positive electrode active material of a boron-containing lithium-manganese composite oxide obtained by mixing lithium hydroxide (LiOH), boron oxide ($B_2O_3$) and manganese dioxide ($MnO_2$) in an atomic ratio of Li:B:Mn of 0.53:0.06:1.00 and then heat treating the mixture in air at a temperature of 850° C. for 20 hours was used and that a mixed solvent of ethylene carbonate (EC) and 1,2-dimethoxyethane (DME) in a ratio by volume of 50:50 was used for the nonaqueous electrolyte, to assemble a comparison battery Z8.

(High-voltage continuous charge test)

The batteries C1 through C4 according to the present invention and the comparison batteries Z1 through Z8 were continuously charged under the same conditions as above and then measured for the internal resistance. It should be noted here that changing the heat treating temperature on preparation of a positive electrode active material results in a change in the crystal structure and average valence of manganese of the resulting boron-containing lithium-manganese oxide. The results are given in Table 3.

TABLE 3

|  | Mixing ratio of LiOH, $B_2O_3$ and $MnO_2$ (atomic ratio of Li:B:Mn) | Heat treating temp. (°C.) | Heat treating atmosphere | Crystal struture of composite oxide | Valence of Mn | Mixing ratio of solvent; BC:EC:DME (by volume) | Internal resistance ($\Omega$) of battery after charge for 20 weeks |
|---|---|---|---|---|---|---|---|
| Battery C1 of the invention | 0.53:0.06:1.00 | 250 | in air | Li-containing $MnO_2$ composite oxide | 3.88 | 25:25:50 | 11 |
| Battery C2 of the invention | 0.53:0.06:1.00 | 375 | in air | $Li_2MnO_3$ + $MnO_2$ | 3.80 | 25:25:50 | 10 |
| Comparison battery Z1 | 0.53:0.06:1.00 | 500 | in air | $LiMn_2O_4$ (broad) | 3.58 | 25:25:50 | 38 |
| Comparison battery Z2 | 0.53:0.06:1.00 | 850 | in air | $LiMn_2O_4$ (sharp) | 3.53 | 25:50;50 | 45 |
| Battery C3 of the invention | 0.53:0.06:1.00 | 250 | in air | Li-containing $MnO_2$ composite oxide | 3.88 | 50:0:50 | 11 |
| Battery C4 of the invention | 0.53:0.06:1.00 | 375 | in air | $Li_2MnO_3$ + $MnO_2$ | 3.80 | 50:0:50 | 10 |
| Comparison battery Z3 | 0.53:0.06:1.00 | 500 | in air | $LiMn_2O_4$ (broad) | 3.58 | 50:0:50 | 34 |
| Comparison battery Z4 | 0.53:0.06:1.00 | 850 | in air | $LiMn_2O_4$ (sharp) | 3.53 | 50:0:50 | 40 |
| Comparison battery Z5 | 0.53;0.06:1.00 | 250 | in air | Li-containing $MnO_2$ composite oxide | 3.88 | 0:50:50 | 20 |
| Comparison battery Z6 | 0.53;0.06:1.00 | 375 | in air | $Li_2MnO_3$ + $MnO_2$ | 3.80 | 0:50:50 | 22 |
| Comparison battery Z7 | 0.53:0.06:1.00 | 500 | in air | $LiMn_2O_4$ (broad) | 3.58 | 0:50:50 | 42 |

TABLE 3-continued

|  | Mixing ratio of LiOH, B$_2$O$_3$ and MnO$_2$ (atomic ratio of Li:B:Mn) | Heat treating temp. (°C.) | Heat treating atmosphere | Crystal struture of composite oxide | Valence of Mn | Mixing ratio of solvent; BC: EC:DME (by volume) | Internal resistance (Ω) of battery after charge for 20 weeks |
|---|---|---|---|---|---|---|---|
| Comparison battery Z8 | 0.53:0.06:1.00 | 850 | in air | LiMn$_2$O$_4$ (sharp) | 3.53 | 0:50:50 | 49 |

Table 3 shows that the batteries C1 through C4 according to the present invention, comprising a solvent having a butylene carbonate content in a range of 5 to 50% by volume for the nonaqueous electrolyte and a boron-containing lithium-manganese composite oxide having an average manganese valence of at least 3.80, showed almost no increase in the internal resistance after continuous charge.

On the other hand, the comparison batteries Z5 and Z6, those Z1 through Z4 and those Z7 and Z8, using a solvent for the nonaqueous solvent having a butylene carbonate content deviating from the range of 5 to 50%, using a boron-containing lithium-manganese composite oxide having an average manganese valence of less than 3.80 and using both of the above solvent for the nonaqueous solvent having a butylene carbonate content deviating from the range of 5 to 50% and boron-containing lithium-manganese composite oxide having an average manganese valence of less than 3.80, respectively, all showed a considerable increase of the internal resistance after continuous charge.

The boron-containing lithium-manganese composite oxide obtained by heat treatment at 375° C. (the positive electrode active material used for the batteries C2 and C4 according to the present invention and comparison battery Z6) is a composite oxide comprising Li$_2$MnO$_3$ and MnO$_2$ and containing boron or a boron compound dissolved therein. The composite oxide of Li$_2$MnO$_3$ and MnO$_2$, in which the crystal structure of the MnO$_2$ is stabilized by the composite formation, has an excellent charge-discharge cycle characteristic. The composite oxide of Li$_2$MnO$_3$ and MnO$_2$ can be obtained by heat treatment at a temperature of 300° to 430° C. (see Japanese Patent Application Laid-open No. 114064/1988).

The boron-containing lithium-manganese composite oxide obtained by heat treatment at 250° C. (the positive electrode active material used for the batteries C1 and C3 according to the present invention and the comparison battery Z5) has an average manganese valence of 3.88. Those obtained at near this temperature have a structure comprising lithium-containing manganese dioxide composite oxide, the structure further having boron or a boron compound dissolved therein to form a solid solution.

The boron-containing lithium-manganese composite oxides obtained by heat treatment at 500° C. and 850° C., respectively, (the positive electrode active materials used for the comparison batteries Z1 through Z4, Z7 and Z8) comprise LiMn$_2$O$_4$ having a spinel structure and having boron or a boron compound dissolved therein to form solid solutions.

In Table 3, the terms "(broad)" and "(sharp)" noted in the column "Crystalline structure of composite oxide" mean that the peaks of LiMn$_2$O$_4$ in the obtained X-ray diffraction patterns were observed to be broad and sharp, respectively. (Test for the relationship between the content of butylene carbonate in the solvent for nonaqueous electrolyte and the discharge capacity)

Example 1-1 was repeated except that a mixed solvent of 1,2-butylene carbonate (BC), ethylene carbonate (EC) and 1,2-dimethoxyethane (DME) in a ratio by volume of 50:25:25, 50:50:0, 60:0:40, 60:20:20, 60:40:0, 70:0:30, 70:15:15 or 70:30:0, to assemble 8 types of lithium secondary batteries differing from each other only in the composition of the solvent for nonaqueous electrolyte.

Figure 2:
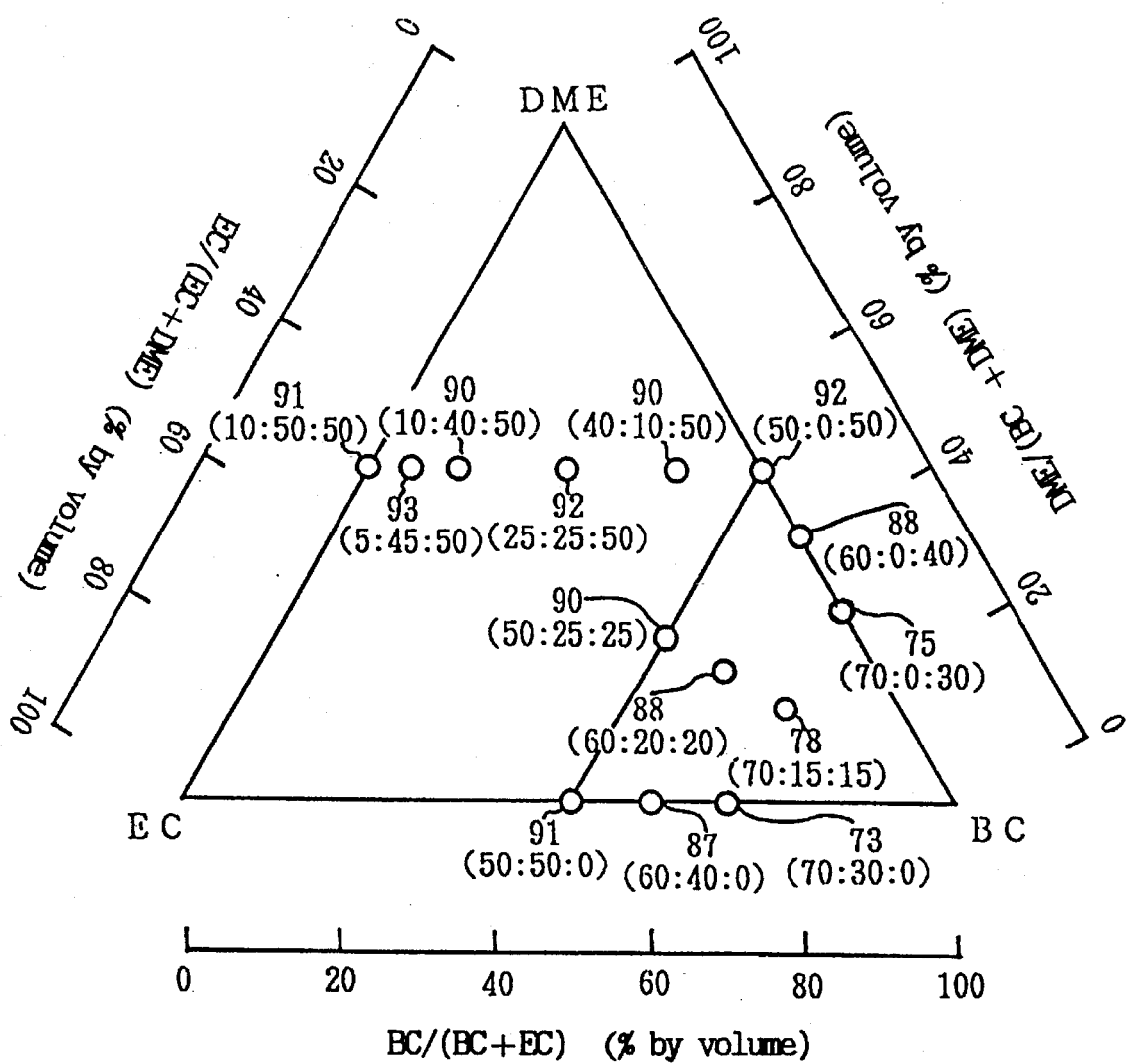
FIG. 2 is a graph (trianglar diagram) showing the relationship between the content of butylene carbonate in a nonaqueous electrolyte and the discharge capacity.

The batteries thus obtained were discharged at a constant resistance (external resistance: 1 kΩ) at a temperature of 25° C. and determined for the discharge capacity. The batteries A1 through A5 according to the present invention and the comparison battery X in the previous Examples and Comparative Example were also tested under the same conditions. The results are shown in FIG. 2. FIG. 2 is a graph (trianglar composition diagram) with the solvent ratios by volume plotted on the sides of a right triangle. In FIG. 2, the position of each plot represents the solvent composition, the numeral given to each plot the discharge capacity (mAh) of the corresponding battery and the numeral given in the parenthesis near each plot the volume ratio of BC:EC:DME.

It is understood from FIG. 2 and the previous Table 1 that: in order to suppress, without decreasing the discharge capacity, the internal pressure of a battery after high-voltage continuous charge, it is necessary to restrict the butylene carbonate content in the solvent for nonaqueous electrolyte within the range of 5 to 50% by volume.

Obviously, numerous modifications and variations of the invention are possible in light of the above teachings. It is therefore to be understood that within the scope of the appended claims, the invention may be practiced otherwise than as specifically described herein.

What is claimed is:

1. A lithium secondary battery comprising a negative electrode having lithium as an active material, a positive electrode comprising a boron-containing lithium-manganese composite oxide as an active material and a nonaqueous electrolyte comprising a solute and a solvent, said boron-containing lithium-manganese composite oxide having an atomic ratio between B and Mn (B/Mn) of 0.01 to 0.20 and an average valence of manganese before charge-discharge of at least 3.80, and said solvent being a mixed solvent containing 5 to 50% by volume of a butylene carbonate selected from the group consisting of 1,2-butylene carbonate, 2,3-butylene carbonate and isobutylene carbonate.

2. The lithium secondary battery according to claim 1, wherein said mixed solvent comprises 5 to 50% by volume of said butylene carbonate and 95 to 50% by volume of at least one organic solvent selected from the group consisting of ethylene carbonate, 1,2-dimethoxyethane, propylene carbonate, vinylene carbonate, γ-butyrolactone, dimethyl carbonate, diethyl carbonate, methylethyl carbonate, tetrahydrofuran, dioxolane, 1,2-ethoxymethoxyethane, sulfolane and 1,2-diethoxyethane.

3. The lithium secondary battery according to claim 1, wherein said solute is LiCF$_3$SO$_3$, LiPF$_6$, LiBF$_4$, LiAsF$_6$ or LiClO$_4$.

4. The lithium secondary batter according to claim 1, wherein said boron-containing lithium manganese composite oxide is a lithium containing manganese dioxide composite oxide having dissolved therein boron or a boron compound.

5. The lithium secondary battery according to claim 4, wherein said lithium-containing manganese dioxide composite oxide having dissolved therein boron or a boron compound has been obtained by heat treating in air a mixture of a boron compound, a lithium compound and a manganese compound in an atomic ratio of B:Li:Mn of 0.01–0.20:0.1–2.0:1 at a temperature of 150° to 430° C.

6. The lithium secondary battery according to claim 4, wherein said lithium-containing manganese dioxide composite oxide having dissolved therein boron or a boron compound is a composite oxide of $Li_2MnO_3$ and $MnO_2$ having dissolved therein boron or a boron compound.

7. The lithium secondary battery according to claim 6, wherein said composite oxide of $Li_2MnO_3$ and $MnO_2$ having dissolved therein boron or a boron compound has been obtained by heat treating in air a mixture of a boron compound, a lithium compound and a manganese compound in an atomic ratio of B:Li:Mn of 0.01–0.20:0.1–2.0:1 at a temperature of 300° to 430° C.

* * * * *

UNITED STATES PATENT AND TRADEMARK OFFICE
CERTIFICATE OF CORRECTION

PATENT NO. :  5,578,395
DATED      :  Nov. 26, 1996
INVENTOR(S):  Yoshimura et al.

It is certified that error appears in the above-indentified patent and that said Letters Patent is hereby corrected as shown below:

On the Cover Page,
  Item [30] Foreign Application Priority Data
        insert
        --Feb. 10, 1995 [JP] Japan....7-046107--

Signed and Sealed this

Twenty-second Day of April, 1997

*Attest:*

BRUCE LEHMAN

*Commissioner of Patents and Trademarks*

*Attesting Officer*